US006964818B1

(12) United States Patent
Darolia

(10) Patent No.: US 6,964,818 B1
(45) Date of Patent: Nov. 15, 2005

(54) THERMAL PROTECTION OF AN ARTICLE BY A PROTECTIVE COATING HAVING A MIXTURE OF QUASICRYSTALLINE AND NON-QUASICRYSTALLINE PHASES

(75) Inventor: Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 267 days.

(21) Appl. No.: 10/414,685

(22) Filed: Apr. 16, 2003

(51) Int. Cl.[7] ............................ B32B 15/04; F03B 3/12; C22C 21/00

(52) U.S. Cl. ........................ 428/632; 428/469; 428/610; 428/650; 428/654; 428/678; 428/679; 428/680; 428/699; 428/702; 427/596; 427/580; 427/456; 204/192.16; 204/192.38; 148/437; 148/438; 148/535; 416/241 R

(58) Field of Search ................................. 428/632, 621, 428/633, 650, 651, 652, 654, 655, 660, 678, 679, 680, 615, 610, 469, 699, 697, 701, 702; 427/596, 580, 456; 204/192.16, 192.38; 148/437, 438, 535; 416/241 R

(56) References Cited

U.S. PATENT DOCUMENTS 5,432,011 A * 7/1995 Dubois et al.
5,433,978 A * 7/1995 Shield et al.
5,472,920 A * 12/1995 Dubois et al.
5,607,523 A * 3/1997 Masumoto et al.
5,652,877 A * 7/1997 Dubois et al.
5,900,210 A * 5/1999 Buchler et al.
6,074,497 A * 6/2000 Inoue et al.
6,103,023 A * 8/2000 Cryot-Lackmann et al.
6,183,887 B1 * 2/2001 Dubois et al.
6,242,108 B1 * 6/2001 Sordelet et al.
6,254,699 B1 * 7/2001 Hermanek
6,254,700 B1 * 7/2001 Hermanek
6,294,030 B1 * 9/2001 Symko et al.
6,331,218 B1 * 12/2001 Inoue et al.
6,533,285 B2 * 3/2003 Nava et al.

FOREIGN PATENT DOCUMENTS

EP 0587186 A1 * 3/1994
EP 1159973 A1 * 12/2001

OTHER PUBLICATIONS

Lang et al, Quasicrystalline coatings: Thermal evolution of structure and properties, J. Mater. Res.,vol. 15, No. 9, Sep. 2000.*

* cited by examiner

*Primary Examiner*—John J. Zimmerman
*Assistant Examiner*—Jennifer McNeil
(74) *Attorney, Agent, or Firm*—Gregory O. Garmong; Kurt L. Ehresman; McNees Wallace & Nurick LLC

(57) ABSTRACT

A coated article includes formed of an alloy having a composition including nickel and aluminum, and a protective coating overlying and contacting the substrate. The protective coating is a mixture of a quasicrystalline metallic phase, and a non-quasicrystalline metallic phase comprising nickel and aluminum. The aluminum is present in an amount of from about 3 to about 35 percent by weight of the non-quasicrystalline metallic phase.

20 Claims, 2 Drawing Sheets

THERMAL PROTECTION OF AN ARTICLE BY A PROTECTIVE COATING HAVING A MIXTURE OF QUASICRYSTALLINE AND NON-QUASICRYSTALLINE PHASES

This invention relates to the thermal protection of substrates against external heating and, more particularly, to the use of a mixed quasicrystalline and non-quasicrystalline protective coating to provide that protection.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

The turbine section of the engine is heated to high temperatures by the hot combustion gases, which are highly oxidizing and also highly corrosive. A number of the components of the turbine section, such as turbine blades and turbine vanes, are made of nickel-base alloys having aluminum present to contribute to the strengthening mechanism. The aluminum and other elements present also impart some oxidation and corrosion resistance to the material. Experience has shown, however, that as the combustion-gas temperature has increased for improved thermodynamic efficiency of the gas turbine engine, the surfaces of the base alloys are not sufficiently oxidation resistant and corrosion resistant.

Coatings have been developed to protect the surfaces of the nickel-aluminum-containing components against oxidation and corrosion more effectively than the bare base metal can protect itself. A protective coating typically includes an aluminum-enriched layer having a higher percentage of aluminum than present in the base-metal alloy. The aluminum in this aluminum-enriched layer oxidizes to form a protective aluminum oxide (alumina) scale at the surface of the aluminum-enriched layer, which scale serves as a diffusion barrier to inhibit further oxidation of the coating and thence of the underlying substrate. A ceramic may overlie the aluminum-enriched layer.

The use of aluminum-base quasicrystalline alloys, which have low thermal conductivities, has been proposed for protective coatings. These quasicrystalline alloys may contain porosity or be mixed with small amounts of heat conductive materials such as particles of aluminum. While this approach potentially has merit, it has not been optimized to reflect the realities of the practical limiting considerations for such protective coatings when used to protect nickel-base alloys in the hot-combustion-gas environment.

There is a need for an approach that makes use of the beneficial thermal properties of quasicrystalline alloys, while at the same time achieves acceptable performance in the gas turbine operating environment. The present invention fulfills this need, and further provides related advantages.

SUMMARY OF THE INVENTION

The present approach provides an article protected against heat and a method for its preparation and use. The thermally protective coating is optimized for use on a substrate such as those found in applications in the gas-turbine section of gas turbine engines. The protective coating is tailored to minimize potential damage from mechanisms such as thermal-cycling strains and stresses, while achieving good protection of the substrate against oxidation and corrosion damage.

The thermally protective coating also has a low thermal conductivity due to the presence of a substantial amount of the low-thermal-conductivity quasicrystalline phase. This low thermal conductivity of the protective coating helps to insulate the substrate. Conventional high-aluminum protective coatings typically have a thermal conductivity that is 2–5 times greater than that of the nickel-base superalloy substrates that they protect. Accordingly, they do not serve to reduce heat flow to the substrate from the hot gases of the environment. In the present case, the thermal conductivity of the composite protective coating is substantially lower, resulting in reduced heat flow to the substrate.

A coated article comprises a substrate having a surface, wherein the substrate comprises nickel and aluminum, and a protective coating overlying and contacting the substrate. The protective coating comprises a mixture of a quasicrystalline metallic phase, and a non-quasicrystalline metallic phase comprising nickel and aluminum. The aluminum is present in an amount of from about 3 to about 35 (preferably from about 15 to about 30) percent by weight of the non-quasicrystalline metallic phase.

Preferably, the quasicrystalline metallic phase is present in the protective coating in an amount of from about 50 volume percent to about 90 volume percent, with the non-quasicrystalline metallic phase the balance although there may be some porosity present as well. The protective coating preferably has a thickness of from about 10 to about 100 micrometers, most preferably from about 25 to about 50 micrometers.

The substrate is typically a nickel-base alloy or superalloy having aluminum and other elements therein. The quasicrystalline phase may be of any operable type, with examples being an alloy comprising iron, copper, and aluminum; an alloy comprising iron, cobalt, chromium, and aluminum; an alloy comprising nickel, cobalt, chromium, and aluminum; an alloy comprising titanium, zirconium, nickel, and silicon; and an alloy comprising titanium, nickel, and zirconium. The non-quasicrystalline metallic phase contains nickel and aluminum. In one embodiment, the non-quasicrystalline metallic phase is the same material as the substrate or with a closely similar composition, and typically with a relatively low aluminum content in the range of about 3–8 weight percent. In another embodiment, the non-quasicrystalline metallic phase has a higher aluminum content, typically from about 15 to about 35 weight percent, and more preferably from about 15 to about 30 weight percent, to provide a transition between the substrate and the quasicrystalline metallic phase while having excellent oxidation and corrosion resistance due to the formation of an aluminum oxide scale at exposed surfaces.

Desirably, a difference between a coefficient of thermal expansion of a portion of the protective coating contacting the substrate surface and a coefficient of thermal expansion of the substrate at the substrate surface is relatively small. Preferably, this difference is not more than about $2\times10^{-6}$° F.

In one embodiment, the protective coating is a graded protective coating. There is a higher volume fraction of the non-quasicrystalline metallic phase adjacent to the surface of the substrate, and a lower volume fraction of the non-quasicrystalline metallic phase remote from the surface of the substrate. This embodiment provides better matching of properties, including the respective coefficients of thermal expansion, of the coating to the substrate at their interface than would a coating with the same properties throughout. Yet the greatest oxidation-resistance and corrosion-resistance properties of the quasicrystalline material are presented at the surface of the protective coating.

In any of these embodiments, the protective coating may be used as a bond coat for an overlying ceramic thermal barrier coating. Thus, there is a ceramic thermal barrier coating overlying and contacting a surface of the protective coating remote from the substrate. The ceramic thermal barrier coating provides additional thermal insulation and protection for the substrate.

A method for providing thermal protection to a coated article comprises the steps of providing a substrate having a surface, wherein the substrate comprises nickel and aluminum, and applying a protective coating overlying and contacting the substrate to form the coated article. The protective coating comprises a mixture of a quasicrystalline metallic phase, and a non-quasicrystalline metallic phase comprising nickel and aluminum. The aluminum is present in an amount of from about 3 to about 35 percent by weight of the non-quasicrystalline metallic phase. A flow of a hot gas is contacted to the coated article. Other features as described herein may be used with this method.

The present approach may be used in a variety of applications, but it is most advantageously used when the substrate is a component of a gas turbine engine. Such components include, for example, a turbine blade and a turbine vane.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
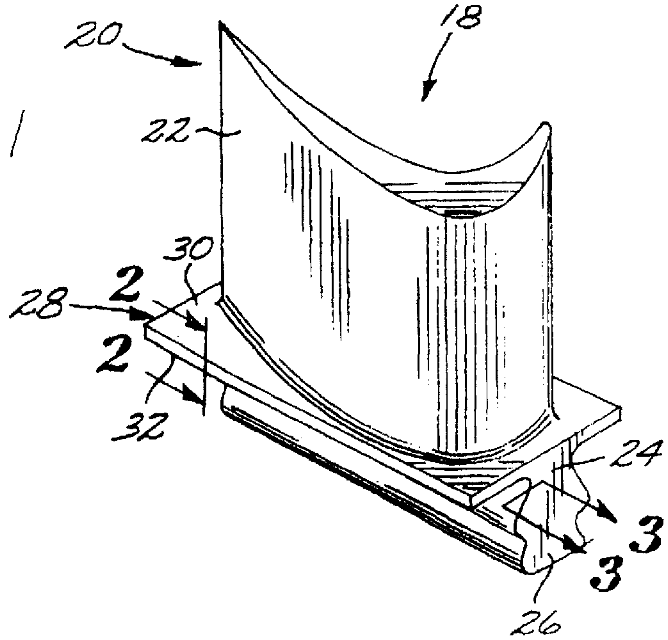
FIG. 1 is a perspective view of a gas turbine blade.

FIG. 1 depicts a component 18 of a gas turbine engine, and specifically a gas turbine blade 20. The use of the present invention extends to other applications as well, for example other components of gas turbine engines such as gas turbine vanes as well as with other articles. The gas turbine blade 20 has an airfoil 22 against which a flow of hot combustion gas impinges during service operation, a downwardly extending shank 24, and an attachment in the form of a dovetail 26 which attaches the gas turbine blade 20 to a gas turbine disk (not shown) of the gas turbine engine. A platform 28 extends transversely outwardly at a location between the airfoil 22 and the shank 24 and dovetail 26. The platform 28 has a top surface 30 adjacent to the airfoil 22, and a bottom surface 32 (sometimes termed an "underside" of the platform) adjacent to the shank 24 and the dovetail 26.

The entire gas turbine blade 20 is preferably made of a nickel-base alloy that also contains aluminum and other alloying elements, which forms a substrate for the deposition of a protective coating. A nickel-base alloy has more nickel than any other element. The nickel-base alloy may be a nickel-base superalloy, which is a nickel-base alloy that is strengthened by gamma-prime phase or a related phase. An example of a nickel-base superalloy with which the present invention may be used is Rene™ N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements. The present approach may be used with a wide variety of substrate materials, and is not limited to use with this example material.

Figure 2:
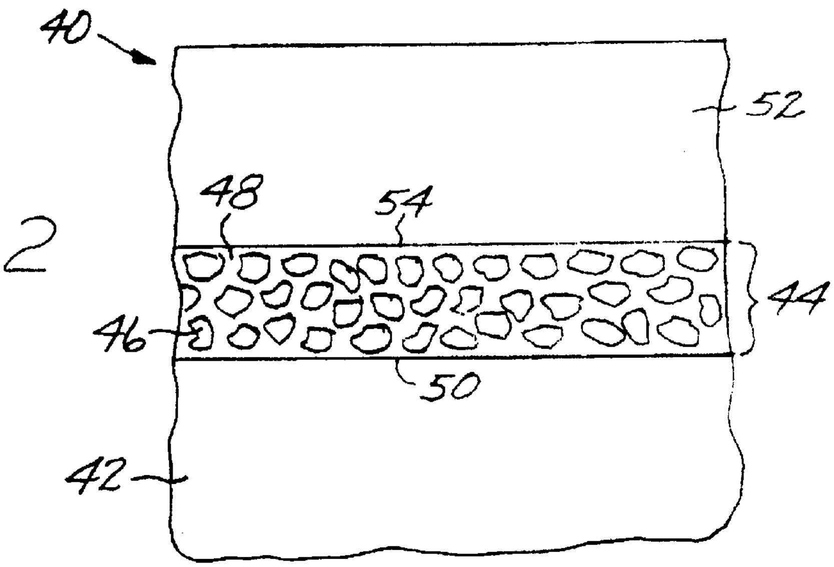
FIG. 2 is a schematic enlarged sectional view of the gas turbine blade of FIG. 1, taken on line 2—2, illustrating a first embodiment of the present approach.
Figure 3:
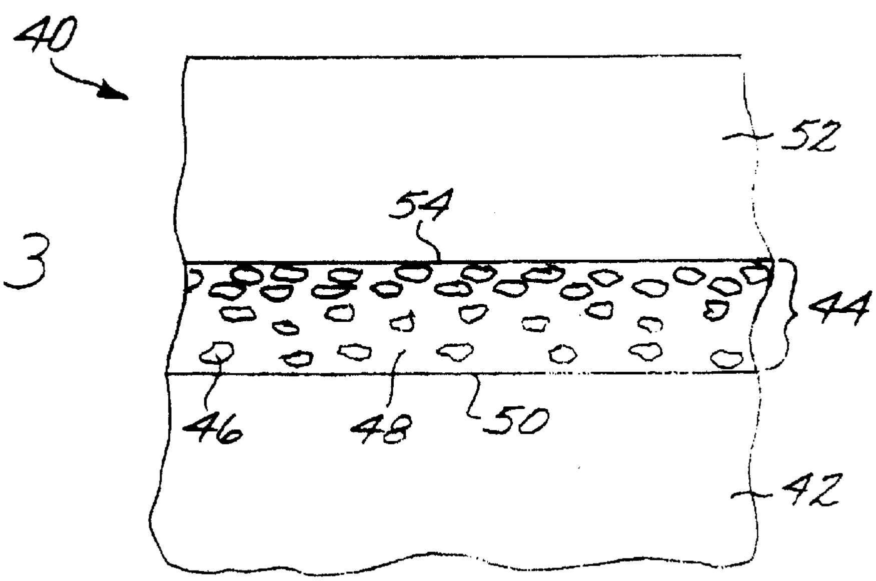
FIG. 3 is a schematic enlarged sectional view of the gas turbine blade of FIG. 1, taken on line 3—3, illustrating a second embodiment of the present approach.

FIGS. 2 and 3 illustrate two embodiments of the present approach. A coated article 40 includes a substrate 42 having a surface 44. In this first preferred embodiment, the substrate 42 is all or a portion of the gas turbine blade 20 or other coated article. In a typical case, the substrate 42 is a portion of the gas turbine blade 20 that is exposed to intermediate temperatures of not more than the maximum stable temperature of the quasicrystalline material used in the protective coating, about 1000° C. for most such materials, rather than the highest temperatures to which the airfoil 22 is exposed. The substrate 42 is preferably the top surface 30 of the platform 28, the bottom surface 32 of the platform 28, or a side surface of the shank 24. The substrate 42 is of a composition that comprises nickel and aluminum, such as the nickel-and-aluminum-containing nickel-base alloys and/or nickel-base superalloys discussed above.

A protective coating 44 overlies and contacts the substrate. The protective coating 44 comprises a mixture of a quasicrystalline metallic phase 46, and a non-quasicrystalline metallic phase 48 having a composition comprising nickel and aluminum.

The aluminum is present in an amount of from about 3 to about 35 percent by weight of the non-quasicrystalline metallic phase 48. If the aluminum content is less than about 3 percent by weight of the non-quasicrystalline metallic phase 48, its ability to form a protective alumina coating is unacceptably reduced and much of its functionality is lost. If the aluminum content is more than about 35 percent by weight of the non-quasicrystalline metallic phase 48, the ductility of the coating may be insufficient.

Within the broad range of from about 3 to about 35 weight percent aluminum in the non-quasicrystalline metallic phase 48, there are two subranges of particular interest. In a first preferred subrange of from about 3 to about 9 weight percent, the non-quasicrystalline metallic phase 48 has an aluminum content, and thence some properties, similar to those of typical nickel-base alloys or nickel-base superalloys to ensure good bonding to, and thermal expansion close to that of, the substrate 42. However, the non-quasicrystalline metallic phase 48 having from about 3 to about 9 weight percent aluminum does not give a high degree of oxidation and corrosion protection to the substrate due to its relatively low aluminum content. In a second preferred subrange of from about 15 to about 30 weight percent, the non-quasicrystalline metallic phase 48 has an aluminum content, and thence some properties, similar to those of nickel-aluminum protective coatings such as NiAl compositions and, with the addition of other alloying elements such as chromium, zirconium, and/or yttrium, NiCrAlZr and NiCrAlY compositions. These compositions have excellent oxidation resistance and remain somewhat similar in character to the substrate 42 to achieve good bonding to the substrate 42.

Quasicrystalline materials operable in the quasicrystalline matrix phase 46 are known in the art. Examples are found in an alloy comprising iron, copper, and aluminum (e.g., $Al_{62.5}Cu_{25}Fe_{12.5}$); an alloy comprising iron, cobalt, chromium, and aluminum (e.g., $Al_{71}Co_{13}Fe_8Cr_8$); an alloy comprising nickel, cobalt, chromium, and aluminum (e.g., $Al_{75}Ni_{15}(CoCr)_{10}$); an alloy comprising titanium, zirconium, nickel, and silicon (e.g., $Ti_{45}Zr_{27}Ni_{20}Si_8$); and an alloy comprising titanium, nickel, and zirconium (e.g., $Ti_{45}$—$Zr_{38}$—$Ni_{17}$). Other elements such as boron may optionally be present. Discussions of quasicrystalline alloys and operable compositions may be found in U.S. Pat. Nos. 6,254,699; 6,242,108; 6,183,887; 5,888,661; and 5,652,877, and publications such as K. F. Kelton, "Ti/Zr-Based Quasicrystals—Formation, Structure, and Hydrogen Storage Properties", Mat. Res. Soc. Symp. Proc., Vol. 553 (1999), page 471, whose disclosures are incorporated by reference. Some of the quasicrystalline materials are stable at elevated temperatures of up to 1000° C. or higher, depending upon the exact composition, sufficient for most applications. The field of quasicrystalline materials is relatively new, and additional alloys are being discovered. The present approach is operable with existing and newly discovered quasicrystalline materials.

Preferably, the quasicrystalline metallic phase 46 is present in the protective coating 44 in an amount of from about 50 volume percent to about 90 volume percent. If the amount of the quasicrystalline metallic phase 46 is outside these limits, the protective coating 44 may still be formed, but its properties are not optimal for the present application. If less than about 50 volume percent of the quasicrystalline metallic phase 46 is present in the protective coating 44, the thermal conductivity of the protective coating 44 is too high, and the protective coating 44 has insufficient oxidation resistance and corrosion resistance. It also has insufficient wear resistance for some applications. If more than about 90 volume percent of the quasicrystalline metallic phase 46 is present in the protective coating 44, there is too little of the more-ductile non-quasicrystalline matrix phase 48 present for the present application, with the result that the ductility and fracture toughness of the protective coating 44 are insufficient. The non-quasicrystalline metallic phase 48 is typically the balance of the protective coating 44, although the presence of some porosity and minor amounts of other phases are permitted.

Preferably, the protective coating 44 has a thickness of from about 10 to about 100 micrometers, preferably from about 25 to about 50 micrometers. Thinner or thicker protective coatings 44 are operable, but they are not optimal. If the protective coating 44 has a thickness of less than about 10 micrometers, it has insufficient oxidation resistance and corrosion resistance for extended-service applications because oxygen and corrosion may penetrate through the protective coating 44 after extended service at elevated temperature. It also has insufficient wear resistance for some applications, because it may wear away after extended wear exposure.

Thermal strains and thence thermal stresses arise because of the difference in thermal expansion between the protective coating 44 and the substrate 42. Such thermal stresses, if sufficiently severe, may cause the protective coating 44 to delaminate from the substrate 42, particularly during thermal cycling wherein the protective coating 44 is repeatedly heated to the service temperature and cooled. There are two ways to minimize the effects of such thermal strains and stresses. In one, the protective coating 44 is limited to a maximum thickness of about 100 micrometers, since the magnitude of the thermal stresses increases with increasing thickness of the protective coating 44. If the protective coating 44 is thicker than about 100 micrometers, there is a much greater concern with delamination. The other approach is to select the phases 46 and 48, and their relative volume fractions, such that the thermal expansion coefficient of the protective coating 44 is about the same as that of the substrate 42. In the present context, "about the same as" means that the difference between the coefficient of thermal expansion of the protective coating 44 and the coefficient of thermal expansion of the substrate 42, measured on either side of a surface 50 of the coated substrate 42, is no more than about $2\times10^{-6}$/° F.

Optionally, there is a ceramic thermal barrier coating 52 overlying and contacting a surface of the protective coating 44 remote from the substrate 42. The ceramic thermal barrier coating 52 is preferably yttria-stabilized zirconia, which is zirconium oxide containing from about 2 to about 12 weight percent, preferably from about 6 to about 8 weight percent, of yttrium oxide. Other operable ceramic materials may be used as well. The ceramic thermal barrier coating 52 is typically from about 0.003 inch to about 0.010 inch thick. When there is no ceramic thermal barrier coating 52 present, the protective coating 44 is termed an "environmental coating". When there is a ceramic thermal barrier coating 52 present, the protective coating 44 is termed a "bond coat". The coated articles 40 of FIGS. 2 and 3 are both illustrated as having the ceramic thermal barrier coating 52 present, although its presence is optional.

The protective coating 44 of FIG. 2, although a composite material, has a substantially homogeneous structure throughout, with substantially the same volume fractions of the two phases 46 and 48 in different regions of the protective coating 44. In another embodiment illustrated in FIG. 3, the protective coating 44 is a graded protective coating having a higher volume fraction of the non-quasicrystalline metallic phase 48 adjacent to the surface 50 of the substrate 42, and a lower volume fraction of the non-quasicrystalline metallic phase 48 remote from the surface 50 of the substrate 42. For some applications, this graded structure of the protective coating 44 improves the adherence of the protective coating 44 to the substrate 42 because of the higher fraction of the non-quasicrystalline metallic phase 48, which is more closely similar to the composition of the substrate 42 than is the quasicrystalline metallic phase 46, in contact with the surface 50. There is then a higher volume fraction of the quasicrystalline metallic phase 46 at a remote surface 54 of the protective coating 44 that is either a free surface (if no ceramic thermal barrier coating 42 is present) or is contacted by the ceramic thermal barrier coating 42. This higher volume fraction of the quasicrystalline metallic phase 46 provides a higher degree of protection against oxidation, corrosion, and, where necessary, wear.

Figure 4:
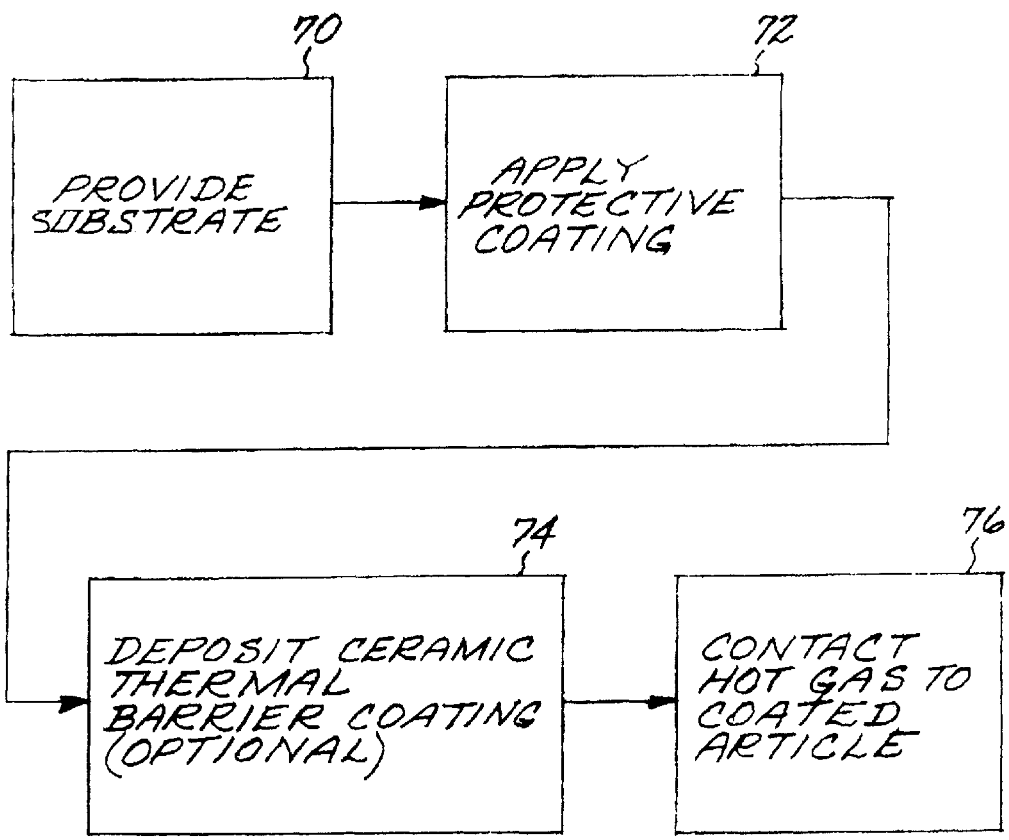
FIG. 4 is a block flow diagram of an embodiment of the method of the invention.

FIG. 4 depicts a preferred approach for preparing and using a coated article 40. A substrate 42, such as the turbine blade 20 of FIG. 1 or other article, is provided, numeral 70. The protective coating 44 is applied to the substrate, numeral 72. Preferred application techniques used in step 72 include physical vapor deposition techniques such as electron beam physical vapor deposition, sputtering, and cathodic arc, and plasma spray techniques such as air plasma spray, low pressure plasma spray, and high velocity oxyfuel deposition. All of these application techniques are known in the art for other applications. The ceramic thermal barrier coating, where used, is deposited, step 74. The ceramic thermal barrier coating 74 may be deposited by any operable technique, such as physical vapor deposition or thermal spray, both of which are known in the art for depositing such ceramic thermal barrier coatings. The compositions, thicknesses, structure, and other parameters of the phases 46 and 48, and the ceramic thermal barrier coating 74, are as described above. A flow of a hot gas is thereafter contacted to the coated article 40, step 76, in testing or service.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A coated article comprising:

a substrate having a surface, wherein the substrate is of a composition that comprises nickel and aluminum; and a protective coating overlying and contacting the substrate, the protective coating comprising a mixture of a quasicrystalline metallic phase, and a non-quasicrystalline metallic phase having a composition comprising nickel and aluminum, wherein the aluminum is present in an amount of from about 3 to about 35 percent by weight of the non-quasicrystalline metallic phase.

2. The coated article of claim 1, wherein the aluminum is present in an amount of from about 15 to about 30 percent by weight of the non-quasicrystalline metallic phase.

3. The coated article of claim 1, wherein the quasicrystalline metallic phase is present in the protective coating in an amount of from about 50 volume percent to about 90 volume percent.

4. The coated article of claim 1, wherein the protective coating is a graded protective coating having a higher volume fraction of the non-quasicrystalline metallic phase adjacent to the surface of the substrate and a lower volume fraction of the non-quasicrystalline metallic phase remote from the surface of the substrate.

5. The coated article of claim 1, wherein the protective coating has a thickness of from about 10 to about 100 micrometers.

6. The coated article of claim 1, wherein the substrate is a component of a gas turbine engine.

7. The coated article of claim 1, wherein the substrate is a component of a gas turbine engine selected from the group consisting of a turbine blade and a turbine vane.

8. The coated article of claim 1, wherein the quasicrystalline phase comprises an alloy selected from the group consisting of an alloy comprising iron, copper, and aluminum; an alloy comprising iron, cobalt, chromium, and aluminum; an alloy comprising nickel, cobalt, chromium, and aluminum; an alloy comprising titanium, zirconium, nickel, and silicon; and an alloy comprising titanium, nickel, and zirconium.

9. The coated article of claim 1, wherein a difference between a coefficient of thermal expansion of a portion of the protective coating contacting the surface of the substrate and a coefficient of thermal expansion of the substrate at the surface of the substrate is no more than about $2 \times 10^{-6}/°$ F.

10. The coated article of claim 1, further including a ceramic thermal barrier coating overlying and contacting a surface of the protective coating remote from the substrate.

11. A method for providing thermal protection to a coated article, comprising the steps of providing a substrate having a surface, wherein the substrate is of a composition that comprises nickel and aluminum;

applying a protective coating overlying and contacting the substrate to form the coated article, the protective coating comprising a mixture of a quasicrystalline metallic phase, and a non-quasicrystalline metallic phase of a composition comprising nickel and aluminum, wherein the aluminum is present in an amount of from about 3 to about 35 percent by weight of the non-quasicrystalline metallic phase; and contacting a flow of a hot gas to the coated article.

12. The method of claim 11, wherein the step of applying includes the step of applying the non-quasicrystalline metallic phase wherein the aluminum is present in an amount of from about 15 to about 30 percent by weight of the non-quasicrystalline metallic phase.

13. The method of claim 11, wherein the step of applying includes the step of applying the protective coating having the quasicrystalline metallic phase present in the protective coating in an amount of from about 50 volume percent to about 90 volume percent.

14. The method of claim 11, wherein step of applying includes the step of applying the protective coating as a graded protective coating having a higher volume fraction of the non-quasicrystalline metallic phase adjacent to the surface of the substrate and a lower volume fraction of the non-quasicrystalline metallic phase remote from the surface of the substrate.

15. The method of claim 11, wherein the step of applying includes the step of applying the protective coating to a thickness of from about 10 to about 100 micrometers.

16. The method of claim 11, wherein the step of providing includes the step of providing the substrate as a component of a gas turbine engine.

17. The method of claim 11, wherein the step of providing includes the step of providing the substrate as a component of a gas turbine engine selected from the group consisting of a turbine blade and a turbine vane.

18. The method of claim 11, wherein the step of applying includes the step of applying the quasicrystalline phase comprising an alloy selected from the group consisting of an alloy comprising iron, copper, and aluminum; an alloy comprising iron, cobalt, chromium, and aluminum; an alloy comprising nickel, cobalt, chromium, and aluminum; an alloy comprising titanium, zirconium, nickel, and silicon; and an alloy comprising titanium, nickel, and zirconium.

19. The method of claim 11, wherein the step of applying includes the step of applying the protective coating such that a difference between a coefficient of thermal expansion of a portion of the protective coating contacting the surface of the substrate and a coefficient of thermal expansion of the substrate at the surface of the substrate is no more than about $2\times10^{-6}$/° F.

20. The method of claim 11, further including at additional step, after the step of applying and before the step of contacting, of depositing a ceramic thermal barrier coating overlying and contacting a surface of the protective coating remote from the substrate.

* * * * *

UNITED STATES PATENT AND TRADEMARK OFFICE

CERTIFICATE OF CORRECTION

PATENT NO. : 6,964,818 B2 Page 1 of 1
DATED : November 15, 2005
INVENTOR(S) : Darolia, Ramgopal It is certified that error appears in the above-identified patent and that said Letters Patent is hereby corrected as shown below:

Column 3,
Line 3, “$2x10^{-6}$ºF” should be -- $2x10^{-6}$/ºF --.

Signed and Sealed this

Fourteenth Day of March, 2006

JON W. DUDAS
*Director of the United States Patent and Trademark Office*